I. ANDERSSON.
LIQUID LEVEL GAUGE.
APPLICATION FILED MAR. 13, 1920.

1,421,365. Patented July 4, 1922.

WITNESSES. INVENTOR.

UNITED STATES PATENT OFFICE.

IVAN ANDERSSON, OF EAST ELMHURST, NEW YORK.

LIQUID-LEVEL GAUGE.

1,421,365.                    Specification of Letters Patent.         Patented July 4, 1922.

Application filed March 13, 1920. Serial No. 365,676.

*To all whom it may concern:*

Be it known that I, IVAN ANDERSSON, a subject of the King of Sweden, residing at East Elmhurst, in the county of Queens and State of New York, have invented new and useful Improvements in Liquid-Level Gauges, of which the following is a specification.

The present invention refers to liquid level gauges and is particularly applicable to gauges of the character of that described and claimed in Letters Patent of the United States 1,361,576, granted to me December 7, 1920.

It has for object to enable all the air to be removed from the interior of the instrument and so secure a perfect working of the gauge.

The elastic wall, which is the prime mover of the instrument, is preferably formed in the shape of a multiple diaphragm and constitutes an elastic box or diaphragm chamber or a series of elastic boxes, similar to the ones used in barometers or barographs, and forming one of the liquid receiving chambers of the gauge. It is supported within the outer casing, which forms the other liquid receiving chamber, by a stud or the like attached to the centre of one of the diaphragms, which are placed more or less vertical and so that their movements, when expanding or contracting, are not impeded. Communication between the interior of the elastic box and the liquid supply is established through a tube leading to an inlet passage in the supporting stud. For the purpose of removing all the air in the elastic box when installing the instrument, a tubular outlet is provided through the supporting stud, one end of which rises to the upper part in the interior of the elastic box, the other end leading to the exterior of the instrument, where it can be hermetically closed. Care is taken that the tube placed in the elastic box does not impede the movements of the diaphragms. By carrying the tube high enough in the elastic box, every particle of air can be removed whereby perfect working conditions are secured for the instrument. If the air in the outer casing has to be removed, a hole is provided at the highest point of the casing and means arranged for closing same.

Figure 1:
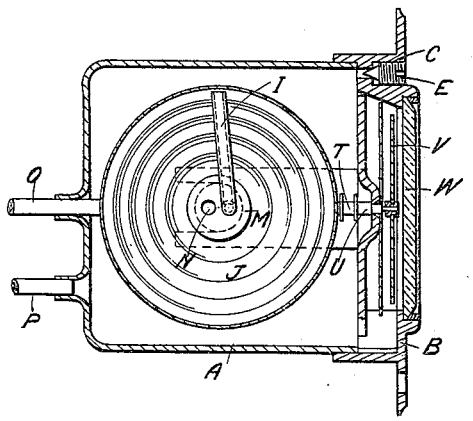
Figure 2:
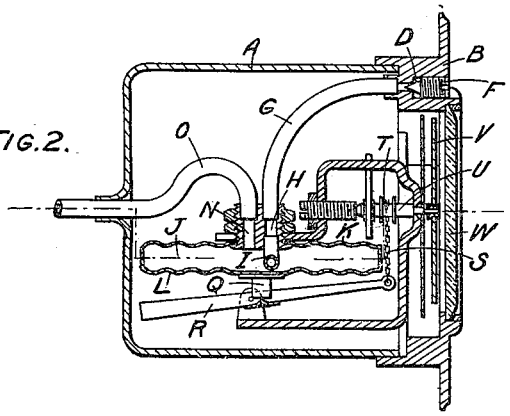
Figure 3:
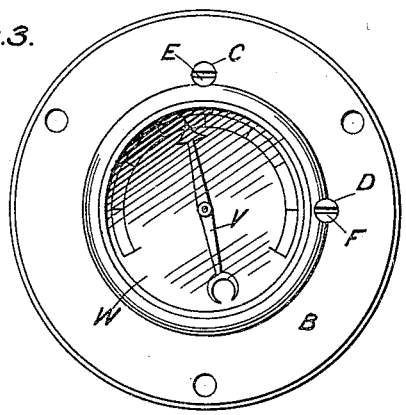

The invention is illustrated on the accompanying drawing in which Fig. 1 is a vertical longitudinal section, Fig. 2 a horizontal longitudinal section, and Fig. 3 a front view of a liquid level gauge which embodies the invention.

The instrument shown in the drawing consists of an outer casing A closed in the front by a plate B containing the outlets C and D, which are closed by the screw plugs E and F. The one outlet C communicates direct with the interior of the casing A, and the other outlet D communicates by means of the tube G, the passage H and vertical tube I with the interior of the elastic box J, or diaphragm chamber which constitutes one of the liquid receiving chambers of the gauge. This elastic box embodies the two diaphragms K and L and is supported by the stud M and the tubes G and O. It communicates with a liquid column or supply, the height of which is to be indicated, through the passage N in the stud M and the tube O. The interior of the casing may be connected to a liquid column or supply by the tube P when the difference in height or the differential pressure is to be shown. The movements of the diaphragms are transmitted by the stud Q, lever R, chain S, and pulley T to the spindle U which carries the indicating hand V. The front plate B may be provided with a glass W.

The invention is of course equally well applicable to gauges which contain no liquid in the outer casing.

I claim:

1. In a gauge, the combination of a diaphragm chamber, an outer support and means to support the diaphragm chamber from the outer support, such means including a liquid inlet tube communicating with the interior of the diaphragm chamber and an air outlet tube also communicating with the interior of the diaphragm chamber at its upper part.

2. In a gauge the combination of a diaphragm chamber, an outer support, a stud secured to the diaphragm chamber, a liquid inlet tube communicating with the interior of the diaphragm chamber through the stud and an air outlet tube also communicating with the interior of the diaphragm chamber at its upper part through the stud.

3. In a gauge, the combination of an outer casing, a diaphragm chamber located within the outer casing and means to support the diaphragm chamber from the outer casing, such means including a liquid inlet tube communicating with the interior of the diaphragm chamber and an outlet tube also communicating with the interior of the diaphragm chamber at its upper part.

4. In a gauge, the combination of an outer casing, a diaphragm chamber located within the outer casing and means to support the diaphragm chamber from the outer casing, such means including a liquid inlet tube communicating with the interior of the diaphragm chamber and an outlet tube also communicating with the interior of the diaphragm chamber at its upper part, the air outlet chamber being provided at the wall of the outer casing with a closing device.

IVAN ANDERSSON.

Witnesses:
ANNETTE MAY WISE,
H. ANDERSSON.